United States Patent [19]

Suzuki et al.

[11] Patent Number: 4,535,274
[45] Date of Patent: Aug. 13, 1985

[54] DRIVING CIRCUIT FOR BRUSHLESS D.C. MOTOR

[75] Inventors: Isamu Suzuki, Funabashi; Yoshio Hattori, Zushi, both of Japan

[73] Assignee: Toyo Electric Co., Ltd., Tokyo, Japan

[21] Appl. No.: 630,961

[22] Filed: Jul. 16, 1984

[30] Foreign Application Priority Data

Jul. 20, 1983 [JP] Japan ................................ 58-130864
Sep. 2, 1983 [JP] Japan ................................ 58-160486

[51] Int. Cl.³ .............................................. H02P 6/02
[52] U.S. Cl. .................................... 318/254; 318/138; 318/439
[58] Field of Search ................... 318/138, 254, 439; 307/252 F

[56] References Cited

U.S. PATENT DOCUMENTS 3,873,897 3/1975 Müller .................................. 318/138
4,099,104 7/1978 Müller .................................. 318/138
4,359,655 11/1982 Fukui ............................. 307/252 F X

FOREIGN PATENT DOCUMENTS 54-34020 3/1979 Japan .................................. 318/138
54-97356 8/1979 Japan ............................. 307/252 F

*Primary Examiner*—William M. Shoop
*Assistant Examiner*—Bentsu Ro
*Attorney, Agent, or Firm*—Pearne, Gordon, Sessions, McCoy, Granger & Tilberry

[57] ABSTRACT

A driving circuit for a brushless motor having a permanent-magnetic rotor is disclosed which is capable of positively carrying out starting of the motor and rapidly interrupting exciting current to protect the motor, when the rotor fails to rotate during the normal operation. The driving circuit includes transistor control circuits each including a capacitor, a PUT, and a capacitor charging circuit comprising a Zener diode and a resistor; and a resistor series circuit for flowing conductive signal current to a transistor switch which serves to supply current to exciting windings. The PUT is conductive to allow the transistor switch to be kept non-conductive when the capacitor is charged to a predetermined voltage.

13 Claims, 6 Drawing Figures

4,535,274

DRIVING CIRCUIT FOR BRUSHLESS D.C. MOTOR

BACKGROUND OF THE INVENTION

1. Field of the Invention

This invention relates to a driving circuit for a brushless motor having a permanent-magnetic rotor, and more particularly to a driving circuit for a motor for driving a fan (hereinafter referred to as "fan motor").

2. Description of the Prior Art

In general, a driving circuit for a fan motor is adapted to detect the position of magnetic poles of a magnetic rotor using a rotor position detecting means to supply exciting current to exciting windings of the stator in turn depending upon an output signal of the rotor position detecting means.

However, the failure of rotation of the rotor due to heavy load or the like causes exciting current to continue to flow through only one of the exciting windings, often resulting in the overheat of the exciting winding or in the worst case the burning. To prevent such defect, it is required to interrupt the exciting current when it continues to flow through the exciting winding over a predetermined period of time.

For this purpose, a detecting circuit has been proposed which serves to count time during which a rotor is stopped and generate a failure signal indicating that an excess of the counted time over a predetermined period of time (set time) means the occurrence of failure of the rotor, and used in a manner to allow the supply of exciting current to be stopped when the failure signal is generated from the detecting circuit.

However, irrespective of the use of such detecting circuit, another defect still cannot be eliminated that the use of a power supply having characteristics that the rising time of voltage of the power supply is lengthened causes the starting time of the rotor or time required for the rotor to start to exceed the set time of the detecting circuit, so that the supply of exciting current is obliged to be stopped prior to the starting of the rotor to render the starting substantially impossible. It is assumed that the elimination of such defect is carried out by lengthening the set time of the detecting circuit. Unfortunately, this causes a significant disadvantage that lengthening of the set time renders the prompt stop of supply of exciting current substantially impossible when the rotor is stopped due to heavy load or the like after the starting

SUMMARY OF THE INVENTION

The present invention has been made in view of the foregoing disadvantages of the prior art.

Accordingly, it is an object of the present invention to provide a driving circuit for a brushless motor which is capable of promptly interrupting the supply of exciting current to protect the motor, when a rotor fails to rotate due to heavy load or the like during the normal operation.

It is another object of the present invention to provide a driving circuit for a fan motor which is particularly suitable for driving a fan.

It is a further object of the present invention to provide a driving circuit for a brushless motor which is capable of supplying exciting current to exciting windings until supply voltage reaches the starting voltage of the motor (voltage required to start the motor) at the starting of the motor and stopping the supply of exciting current within a predetermined period of time to carry out the protection of the motor when the rotor is stopped due to heavy load or the like after the starting.

In accordance with the present invention, there is provided a driving circuit for a brushless motor having a permanent-magnetic rotor which is adapted to supply exciting current to exciting windings of said motor from a power source in turn to rotate said rotor, comprising a rotor position detecting means adapted to detect polarity of magnetic poles of said rotor to detect the position of said rotor; transistor switches respectively connected in series to said exciting windings and adapted to allow exciting current to be supplied to said exciting windings when they are rendered conductive; and transistor switch control circuits provided with respect to said transistor switches to selectively control said transistor switches depending upon an output signal generated from said rotor position detecting sensor, respectively; said transistor switch control circuits each comprising: a resistor series circuit comprising first and second resistors connected in series together and adapted to supply conductive signal current from said power supply to a signal input terminal of said transistor switch depending upon the output signal from said rotor position detecting means; a capacitor means; a charging circuit comprising a Zener diode and a third resistor for charging said capacitor means by means of supply voltage, said Zener diode having a Zener level determined to allow said Zener diode to be conductive when said supply voltage exceeds the starting voltage of said motor; and a PUT of which the anode-cathode circuit is connected in parallel with both ends of said capacitor means and the gate is connected to the connection between said first and second resistors.

BRIEF DESCRIPTION OF THE DRAWINGS

Other objects and many of the attendant advantages of the present invention will be readily appreciated as the same becomes better understood by reference to the following detailed description when considered in connection with the accompanying drawings in which like reference characters designate the same parts throughout, wherein.

DETAILED DESCRIPTION OF THE PREFERRED EMBODIMENTS

Now, a driving circuit for a brushless motor will be described by way of example with reference to the accompanying drawings.

Figure 1:
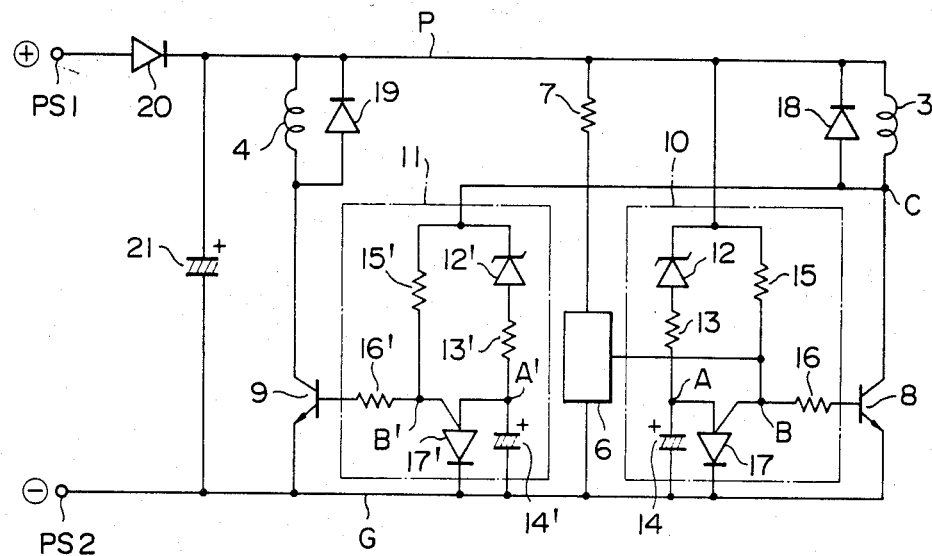
FIG. 1 is a circuit diagram of a fan motor driving circuit which is one embodiment of a driving circuit for a brushless motor according to the present invention.
Figure 2:
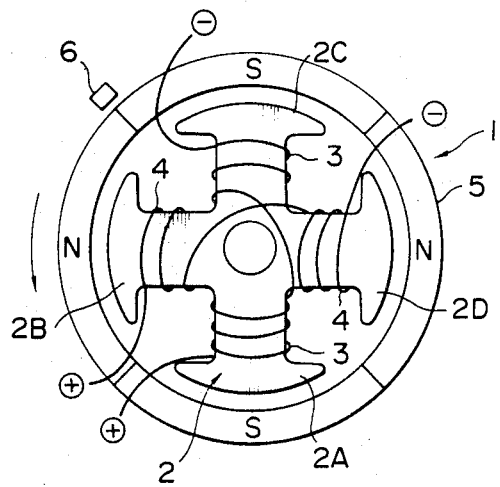
FIG. 2 is a schematic view showing a brushless motor having a permanent-magnetic rotor.

FIG. 1 is a circuit diagram illustrating one embodiment of a driving circuit for a brushless motor according to the present invention, and FIG. 2 is a schematic view showing one example of a brushless motor having a permanent-magnetic rotor.

First, a brushless motor will be briefly described with reference to FIG. 2.

A brushless motor generally designated by reference numeral 1 in FIG. 2 includes a stator core 2 having four field magnets 2A, 2B, 2C and 2D. The field magnets 2A and 2C positionally spaced at an angle of 180 degree from each other and forming a pair each have a first winding 3 wound thereon and the other pair of magnets 2B and 2D each have a second winding 4 wound thereon. The motor 1 also includes a rotor of the permanent magnet type 5 arranged at the outside of the stator core 2 to be concentrical therewith. Reference numeral 6 designates a rotor position detecting means which serves to detect the position of the magnetic poles of the rotor 5 to detect the position of the rotor. The supply of exciting current to the exciting windings 3 and 4 is alternately carried out depending upon an output signal generated from the detecting means 6.

Now, a driving circuit of the embodiment which is adapted to be used for the brushless motor 1 of such construction will be described with reference to FIG. 1.

In the driving circuit illustrated, the first and second exciting windings 3 and 4 of the brushless motor 1 are connected together through the collector-emitter circuits of transistors 8 and 9 for allowing exciting current to flow through the windings between a line or wire P connected to the positive terminal PS1 of a DC power supply and an earth line or wire G connected to the negative terminal PS2 of the power supply. Also, between the lines P and G is connected the rotor position detecting means 6 through a resistor 7 which acts to detect the position of the rotor 5 of the motor 1. A detecting element of the rotor position detecting means 6 used in the embodiment comprises a hall device which is adapted to detect the variation in magnetic flux caused by the transfer of the magnetic poles due to the rotation of the rotor 5.

Reference numerals 10 and 11 designate first and second transistor control circuits, respectively. The first transistor control circuit 10 comprises a series circuit comprising a Zener diode 12, a charging resistor 13 and a capacitor 14 for a timer and connected in series between the lines P and G; a series circuit comprising first and second resistors 15 and 16 and connected in series between the line P and the base of the transistor 8; and a programmable unijunction transistor 17 (hereinafter abbreviated as "PUT") of which the anode-cathode circuit is connected between the earth line G and the connection A of the charging resistor 13 with the capacitor 14 and the gate is connected to the connection B between the first and second resistors 15 and 16. The Zener diode 12 has a Zener level determined to allow the diode 12 to be conductive with voltage equal to that necessary to accomplish the starting of the motor 1 or more. The rotor position detecting means 6 has an output terminal connected to the connection B between the first and second resistors 15 and 16.

The second transistor control circuit 11 is connected between the connection C of the first exciting winding 3 to the first transistor 8 and the base of the second transistor 9. The second transistor control circuit 11 is constructed in the substantially same manner as the first one 10, except the following; thus, in FIG. 1, the parts of the second transistor control circuit corresponding to those of the first one are designated by like reference characters having a dash put thereafter. The second transistor control circuit 11 is different from the first one in that the connection between a Zener diode 12' and a first resistor 15' is connected to the connection C between the first exciting winding 3 and the first transistor 8.

Reference numerals 18 and 19 designate diodes connected in parallel to the exciting windings 3 and 4 to absorb surge voltage, respectively; and reference numeral 20 indicates a counter-flow blocking diode of which the anode is connected to the line P in a manner to face the terminal PS1 and reference numeral 21 indicates a smoothing capacitor connected between the line P and the earth line G on the cathode side of the diode 20.

Now, the manner of operation of the driving circuit constructed in the manner as described above will be described with reference to FIGS. 1 and 3.

Figure 3:
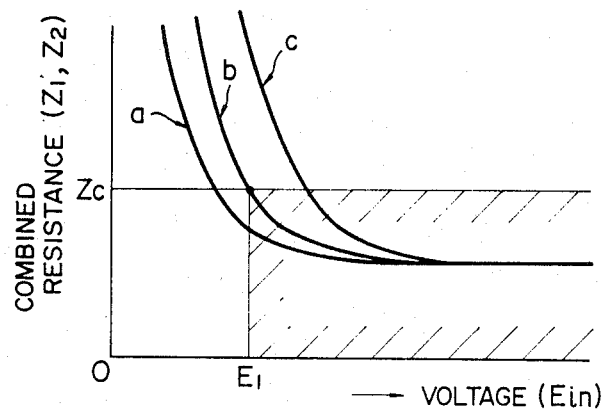
FIG. 3 is a graphical representation showing the characteristics of combined resistance to the variation of voltage.

In the embodiment, as described above, the Zener diodes 12 and 12' are connected in series to the charging resistors 13 and 13' of the transistor control circuits 10 and 11, respectively. In FIG. 3, $Z_1$ and $Z_2$ represent the combined impedance or resistance between the Zener diode 12 and resistor 13 and the combined resistance between the Zener diode 12' and resistor 13', respectively. The characteristics of the combined resistances $Z_1$ and $Z_2$ with respect to the variation in voltage are non-linear as shown in FIG. 3. More particularly, $Z_1$ and $Z_2$ each have a very high value when applied voltage $E_{in}$ is low; whereas when the applied voltage exceeds the Zener level of each of the Zener diodes 12 and 12', $Z_1$ and $Z_2$ are rapidly decreased to approach the resistances of the charging resistor 13 and 13', respectively. In FIG. 3, curves a, b and c each indicate that the manner of variation in the combined resistances $Z_1$ and $Z_2$ depends upon the selection of the Zener levels of the Zener diodes 12 and 12'. $Z_c$ on the axis of ordinates in FIG. 3 indicates the critical value of resistance for the PUT 17 or 17' substantially determined by the resistances of the resistors 15 or 15' and 13 or 13', and $E_1$ on the axis of abscissas indicates the anode voltage of the PUT required to render the PUT conductive. When each of the combined resistances $Z_1$ and $Z_2$ is larger than the critical value, the PUT is in an oscillation operation area; so that it may not be kept conductive even when the anode voltage of the PUT once exceeds the voltage $E_1$. When the combined resistances $Z_1$ and $Z_2$ each are lower than the critical value, the PUT is in a one-shot operation area which keeps the PUT conductive once the anode voltage of the PUT exceeds the voltage $E_1$ to allow it to be turned on, so that current continues to flow through the anode-cathode circuit and gate-cathode circuit of the PUT. The turning-on of the PUT requires at least the condition that the anode voltage exceeds the gate voltage. Such condition is satisfied when the PUT is in the one-shot operation area.

The Zener diodes 12 and 12' each have a Zener level determined to be larger than the starting voltage of the motor. More particularly, the Zener diodes are allowed to be conductive, when the input voltage is equal to the starting voltage of the motor or voltage required to start the motor, or more.

Such setting of the Zener level results in the anode voltage of the PUT being below the voltage $E_1$ when the input voltage does not reach the starting voltage of the motor, because each of the Zener diodes 12 and 12' is never conductive. On the contrary, an excess of the input voltage over the Zener level permits the control circuits 10 and 11 to carry out the protecting operation, because the anode voltage of the PUT is above the voltage $E_1$.

The rotor position detecting means 6 includes a switch circuit which serves to connect the output terminal to the earth line G while the rotor position detecting means 6 is detecting one of the magnetic poles N and S and cut off the output terminal from the earth line G while it is detecting the other magnetic pole. Thus, the output terminal of the detecting means 6 is not connected to the earth line G so far as a signal is generated from the detecting means 6.

While the detecting means 6 is generating a signal, conductive signal current or base current is permitted to flow through the resistors 15 and 16 to the base-emitter circuit of the transistor 8, so that the transistor becomes conductive to allow exciting current to flow through the exciting winding 3. At this time, the connection C of the winding 3 is substantially at the ground potential, resulting in current being not supplied to the base of the transistor 9. Then, when the detecting means 6 is at a state that a signal is not generated therefrom, the output terminal of the detecting means 6 is at the ground potential, so that the supply of current to the base of the transistor 8 is stopped, resulting in the transistor 8 being non-conductive. When the transistor 8 is non-conductive, current is supplied through the resistors 15' and 16' to the base of the transistor 9 to render the transistor 9 conductive. During the transistor 9 being conductive, exciting current flows through the exciting winding 4. Such operation of the driving circuit is repeated so far as the motor is normally operated or the rotor is rotated at a rotational speed above a predetermined one.

The stopping of the rotor due to any cause in the operation stops the variation of a signal generated from the detecting means 6. This causes one of the transistors 8 and 9 to be kept conductive. For example, supposing that the transistor 8 is kept conductive, the capacitor 14 is charged at a time constant determined by the combined resistance $Z_1$ larger than the critical resistance value $Z_c$ and the capacitance of the capacitor 14, because the input voltage exceeds the Zener level of the Zener diode 12. The time constant is determined to have a value sufficient to allow a period of time necessary for the charging voltage of the capacitor 14 to reach the voltage $E_1$ required to render the PUT conductive to suitably exceed that during which the transistors 8 and 9 are kept conductive at the normal operation. When the charging voltage of the capacitor 14 (voltage at the connection A) reaches the voltage $E_1$, the PUT is rendered conductive to allow current to flow through the anode-cathode and gate-cathode circuits thereof. This results in the potential at the connection B being substantially equal to the ground potential, to thereby cause the transistor 8 to be and kept non-conductive. The turning-off of the transistor 8 renders the transistor 9 conductive. However, when the charging voltage of the capacitor 14' (potential at the connection A') in the control circuit 11 is increased to reach the voltage $E_1$, the PUT 17' is rendered conductive to carry out the turning-off of the transistor 9; thus, the supply of exciting current to the exciting winding 4 is stopped. In the case that the transistor 9 becomes conductive or is turned on when the rotor is stopped, the PUT 17' is rendered conductive to cause the transistor 9 to be turned off; thus, the operation is stopped.

Now, the manner of operation of the driving circuit at the starting of the motor will be described.

At the starting of the motor, the supply voltage or the voltage across both ends of the exciting winding 3 or 4 is gradually increased. A period of time necessary for such voltage to increase to the starting voltage or voltage required to start the rotor is varied depending upon the characteristics of the power supply. In the embodiment, the Zener diode 12 and 12' each have a Zener level sufficient to render the diodes conductive when the input voltage exceeds the starting voltage, so that the transistor 8 or 9 never continues to be kept non-conductive until the supply voltage reaches the starting voltage. Thus, it will be noted that the embodiment is adapted to effectively carry out the starting of the motor irrespective of the characteristics of the power supply. Also, in the case that the rotor fails to rotate due to any cause at the starting; the PUT 17 or 17' is rendered conductive in a predetermined period of time after the supply voltage reaches the starting voltage, to thereby allow the transistors 8 and 9 to be non-conductive as in the stopping of the rotor at the operation. Thus, it will be noted that the overheat or burning of the exciting windings may be effectively prevented. Further, when the rotational speed of the rotor fails to increase to a predetermined rotational speed due to heavy load or the like, the capacitor 14 or 14' are charged to voltage $E_1$ required to render the PUT 17 or 17' conductive, resulting in the PUT being turned on to keep the transistor 8 and 9 non-conductive.

The embodiment described above is adapted to directly control the transistor 8 of the transistor control circuit 10 by means of the rotor position detecting means 6. However, the embodiment may be modified in such a manner that the transistor 9 of the second transistor control circuit 11 may be directly controlled by means of an inverted output generated from the rotor position detecting means 6. More particularly, the inverted output of the detecting means 6 is connected to the connection B' and the connection between the resistor 15' and the Zener diode 12' is directly connected to the line P. Such modification has an advantage of rapidly carrying out the protecting operation, as compared with the construction adapted to stop the transistors 8 and 9 in sequence.

Further, the embodiment, as described above, is constructed to flow exciting current by means of one transistor, however, it is a matter of course that two transistors or more may constitute the transistor switch.

Figure 4:
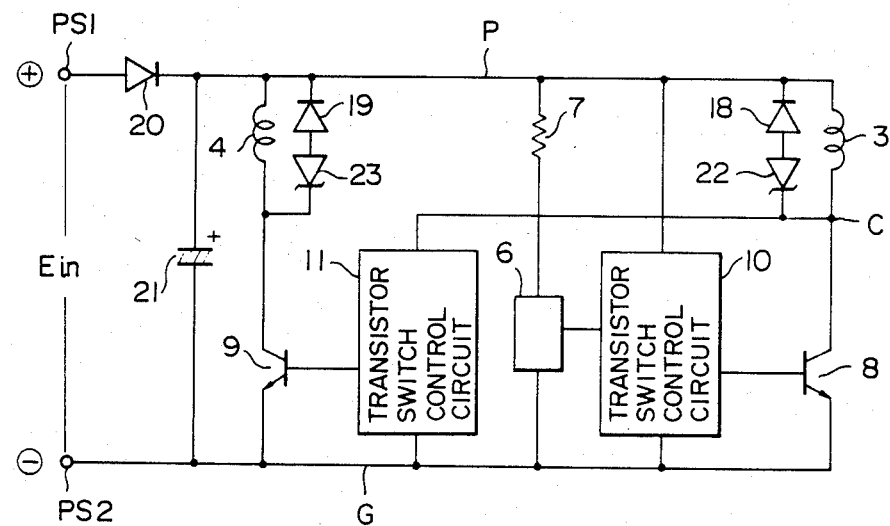
FIG. 4 is a circuit diagram showing another embodiment of a driving circuit according to the present invention.
Figure 5:
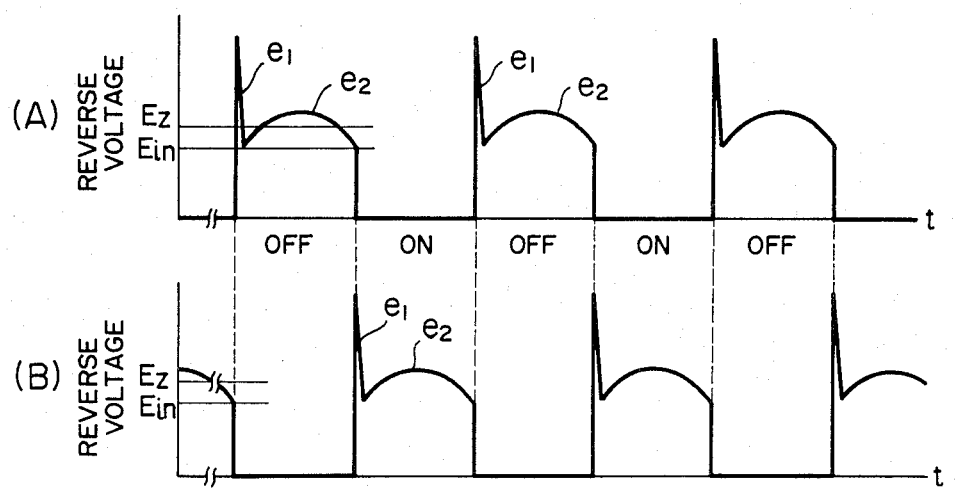
FIG. 5 is a wave form chart showing surge voltage and reverse voltage induced across exciting windings.

Furthermore, in the embodiment, the absorption of surge voltage is accomplished using the surge killer diodes 18 and 19 respectively connected in parallel to the exciting windings 3 and 4. However, this may be carried out by respectively connecting the Zener diodes 22 and 23 in series to the diodes 18 and 19 in the direction of blocking forward current, as shown in FIG. 4. In this instance, the Zener level of each of the Zener diodes 22 and 23 is set between the maximum value and the minimum value of reverse voltage $e_2$ induced across the corresponding exciting winding 3 or 4. However, the flowing of current through the diode 18 or 19 for a period of time during which the reverse voltage $e_2$ is generated as shown in FIG. 5 causes a defect that magnetic flux generated by such current inflicts a braking action on the rotor to decrease the rotational speed of the rotor below the rated value. For the purpose of eliminating such defect, the Zener diodes 22 and 23 are provided to absorb or block the surge voltage $e_1$ and absorb a part of the reverse voltage. Also, suitable selection of the Zener level keeps the rotational speed of the rotor substantially constant.

More particularly, the interruption of exciting current flowing through the exciting windings 3 and 4 causes large surge voltage $e_2$ to be induced, as shown in FIGS. 5(A) and 5(B). The surge voltage $e_1$ exceeds the Zener level $E_z$ to render the Zener diodes 22 and 23 conductive, so that forward current flows through the surge killer diodes 18 and 19. This allows the Zener diodes 22 and 23 to absorb the surge voltage $e_1$. Subsequent to such surge voltage $e_1$, reverse voltage $e_2$ is then induced across the exciting windings 3 and 4 due to interlinkage with magnetic flux of the permanent magnets of the rotor 5. When the reverse voltage $e_2$ exceeds the Zener level $E_z$, the Zener diodes 22 and 23 are rendered conductive to supply forward current to the surge killer diodes 18 and 19; so that the reverse voltage $e_2$ may be absorbed and a braking action may be inflicted on the motor 1 to restrain the increase in rotational speed N of the rotor 5. If the reverse voltage $e_2$ is lower than the Zener level $E_z$, the Zener diodes 22 and 23 are not rendered conductive, so that forward current may not be supplied to the surge killer diodes 18 and 19 to inflict a braking action on the motor. Thus, in this instance, the rotational speed N of the rotor 5 is determined depending upon the input voltage $E_{in}$ and the decrease in rotational speed N due to the reverse voltage does not occur. When the input voltage $E_{in}$ is varied due to the variation of load or the like, the reverse voltage $e_2$ is also varied depending upon the input voltage $E_{in}$. However, the self-control of the Zener diodes 22 and 23 minimizes the variation in rotational speed N of the rotor 5 to keep the rotational speed substantially constant.

Figure 6:
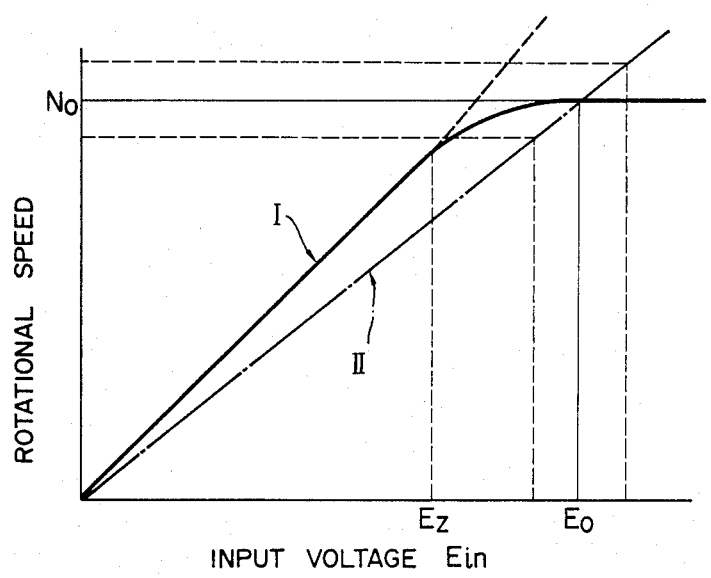
FIG. 6 is a graphical representation showing the rotational characteristics of a rotor with respect to input voltage of the driving circuit shown in FIG. 4.

FIG. 6 shows the variation of rotational speed N with respect to input voltage in the circuit shown in FIG. 4. Curve I indicates such variation in the embodiment and curve II indicates that in a circuit which does not have the Zener diodes 22 and 23 arranged therein. As is apparent from FIG. 6, the series connection of the Zener diodes 22 and 23 to the killer diodes 18 and 19 effectively restrains the variation of rotational speed N with respect to the variation of input voltage $E_{in}$. Particularly, this minimizes the variation of rotational speed near the rated voltage, to thereby keep the rotational speed substantially constant in this range.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A driving circuit for a brushless motor having a permanent-magnetic rotor which is adapted to supply exciting current to exciting windings of said motor from a power source in turn to rotate said rotor, comprising:
   a rotor position detecting means adapted to detect polarity of magnetic poles of said rotor to detect the position of said rotor;
   transistor switches respectively connected in series to said exciting windings and adapted to allow exciting current to be supplied to said exciting windings when they are rendered conductive; and
   transistor switch control circuits provided with respect to said transistor switches to selectively control said transistor switches depending upon an output signal generated from said rotor position detecting means, respectively;
   said transistor switch control circuits each comprising:
   a resistor series circuit comprising first and second resistors connected in series together and adapted to supply conductive signal current from said power supply to a signal input terminal of said transistor switch depending upon the output signal from said rotor position detecting means;
   a capacitor means;
   a charging circuit comprising a Zener diode and a third resistor for charging said capacitor means by means of supply voltage, said Zener diode having a Zener level determined to allow said Zener diode to be conductive when said supply voltage exceeds the starting voltage of said motor; and
   a PUT of which the anode-cathode circuit is connected in parallel with both ends of said capacitor means and the gate is connected to the connection between said first and second resistors.

2. A driving circuit as defined in claim 1, wherein said rotor position detecting means includes a hall device for detecting polarity of magnetic poles of said rotor.

3. A driving circuit as defined in claim 1, wherein said transistor switches each comprise a plurality of transistors.

4. A driving circuit as defined in claim 1, the combined resistance of the resistance of said Zener diode and the resistance of said third resistor obtained when said Zener diode is conductive is lower than the critical value of resistance for said PUT.

5. A driving circuit as defined in claim 4, wherein a time constant determined by said combined resistance and said capacitor has a value sufficient to prevent the terminal voltage of said capacitor from being increased to voltage required to render said PUT conductive within time when said transistor switches are conductive during the rotation of said motor at a rotational speed above a predetermined level.

6. A driving circuit as defined in claim 1, wherein said exciting windings each have a series circuit comprising a surge killer diode and a Zener diode for blocking forward current of said surge killer diode connected in parallel therewith.

7. A driving circuit as defined in claim 6, wherein said Zener diode has a Zener level determined between the maximum and minimum values of reverse voltage induced across said exciting windings.

8. A driving circuit for a brushless motor comprising:
   a pair of exciting windings wound on a core of a stator;
   a rotor position detecting means adapted to detect polarity of magnetic poles of a rotor to detect the position of said rotor;
   a pair of transistor switches connected in series to said pair of exciting windings and adapted to allow exciting current to flow therethrough from a power supply to said exciting windings, respectively; and a pair of transistor switch control circuits adapted to control said pair of transistor switches depending upon an output signal generated from said rotor position detecting means, respectively;

said transistor switch control circuits each comprising:

a resistor series circuit comprising first and second resistors connected in series together and provided between a signal input terminal of said transistor switch and one of the outputs of said power supply to supply conductive signal current to the signal input terminal of said transistor switch;

a capacitor;

a capacitor charging circuit including a Zener diode and a third resistor connected in series together;

said capacitor charging circuit being adapted to allow voltage applied to said Zener diode to exceed the Zener voltage when said supply voltage exceeds the starting voltage of said motor, said capacitor being charged through said third resistor and said Zener diode; and a PUT of which the anode-cathode circuit is connected in parallel to both ends of said capacitor and the gate is connected to the connection between said first and second resistors.

9. A driving circuit as defined in claim 8, wherein the output terminal of said rotor position detecting means is connected to the connection between said first and second resistors of one of said pair of transistor switch control circuits, the other transistor switch control circuit being connected to one of the output terminals of said power supply through said exciting winding to which the transistor switch controlled by said one transistor switch control circuit is connected; and said rotor position detecting means is adapted to block the supply of said conductive signal current to said transistor switch for a period of time during which said detecting means detects one of said magnetic poles of said rotor.

10. A driving circuit as defined in claim 1, wherein said rotor position detecting means has two output terminals which respectively generate output signals opposite to each other, said two output terminals being respectively connected to the connections between said first and second resistors of said pair of transistor switch control circuits; and said detecting means is adapted to block the supply of said conductive signal current to said transistor switches for a period of time during which a signal is not generated from said output terminals.

11. A driving circuit as defined in claim 8, wherein the combined resistance between said Zener diode and said third resistor obtained when said Zener diode is conductive is lower than the critical value of resistance for said PUT.

12. A driving circuit as defined in claim 11, wherein a time constant determined by said combined resistance and the capacity of said capacitor has a value sufficient to prevent the terminal voltage of said capacitor from being increased to voltage required to render the PUT conductive within time when said transistor switches are conductive during the normal operation of said motor.

13. A driving circuit for a brushless motor which is adapted to supply exciting current to exciting windings of said motor from a power supply in turn to rotate a permanent-magnetic rotor, comprising:

a rotor position detecting means for detecting the position of said rotor;

transistors connected in series to said exciting windings and adapted to allow exciting current to flow to said exciting windings when they are rendered conductive, respectively; and transistor control circuits provided with respect to said transistors to control said transistors depending upon the output of said rotor position detecting means;

said transistor control circuits each comprising:

a series circuit comprising first and second resistors and provided between the base of said transistor and one of the outputs of said power supply to allow current to be supplied to said base of said transistor;

a series circuit comprising a Zener diode, a third resistor and a capacitor connected in series together and provided between both outputs of said power supply, said Zener diode having a Zener level selected to exceed the starting voltage of said motor; and a PUT of which the anode-cathode circuit is connected in parallel to both ends of said capacitor and the gate is connected to the connection between said first and second resistors.

* * * * *